United States Patent [19]

Coppa et al.

[11] 4,118,643
[45] Oct. 3, 1978

[54] COMPLIANT MHD ELECTRODE STRUCTURE

[75] Inventors: Anthony Patrick Coppa; Bert Zauderer, both of Merion, Pa.

[73] Assignee: General Electric Company, Fairfield, Conn.

[21] Appl. No.: 768,641

[22] Filed: Feb. 14, 1977

[51] Int. Cl.² .......................................... H02K 45/00
[52] U.S. Cl. .................................................. 310/11
[58] Field of Search ................... 310/11; 313/311, 346

[56] References Cited

U.S. PATENT DOCUMENTS

| 3,149,253 | 9/1964 | Luebke | 310/11 |
| 3,165,652 | 1/1965 | Prater | 310/11 |
| 3,428,834 | 2/1969 | Yerouchalmi | 310/11 |
| 3,430,082 | 2/1969 | Yerouchalmi | 310/11 |
| 3,479,538 | 11/1969 | Yerouchalmi | 310/11 |
| 3,508,087 | 4/1970 | Millet et al. | 310/11 |
| 3,574,144 | 4/1971 | Yerouchalmi | 310/11 |

*Primary Examiner*—Donovan F. Duggan
*Attorney, Agent, or Firm*—Allen E. Amgott; Raymond H. Quist

[57] ABSTRACT

Ceramic electrode is brazed to compliant support, a plurality of curved metal strips mounted on edge, opposite edges being brazed to cooling block. Compliance permits expansion and distortion of electrode when heated without development of stress damaging to brazed joints or to electrode.

2 Claims, 5 Drawing Figures

COMPLIANT MHD ELECTRODE STRUCTURE

CROSS REFERENCES TO COPENDING APPLICATION

Compliant MHD Electrode Support, serial number not yet known, filing date the same as that of this application, by Michael J. Noone and Earl (NMI) Feingold, assigned to the assignee of this application, Docket 39-SE-2488.

BACKGROUND OF THE INVENTION

1. Field of the Invention

This invention pertains to the generation of electrical energy by magnetohydrodynamics, employing hot ionized gases as the working fluid, and more particularly to an electrode structure suitable for use in such a device.

2. Summary of the Prior Art

Mucn of magnetohydrodynamics (hereafter, and more conventionally, MHD) for converting thermal energy into electrical envisages the use of hot gases as the conductive fluid medium. From the pure MHD viewpoint, liquids are much simpler to handle; highly conductive liquids are common, and any that are corrosive can usually be withstood by some available conductive electrode material, as evidenced by numerous MHD pumps. But liquids do not remain liquid over a thermodynamically desirable temperature range. Efficient conversion of thermal energy into electrical energy by MHD compels the use of hot gases which are usually oxidizing, possibly otherwise corrosive from fuel impurities, and are ordinarily seeded with reactive materials such as cesium to promote ionization; they are ordinarily above the melting points of available metals. Some ceramics, such as certain spinels, are not only resistant to this inhospitable atmosphere, but have the fortunate property of being electrically conductive at high temperatures. Other ceramics have electrical conductivity sufficiently low even at high temperatures to make them satisfactory insulators. Also, refractory members are required to form gas passages. All three have the common limitation that their exposed faces must be cooled to keep them below their melting or deformation temperature, which is not so high as the gas temperature to which they are exposed. This may be done by cooling the reverse of the ceramic by attaching it with low thermal resistance (and, for the electrodes, with low electrical resistance) to a metal cooling block. This may be done by brazine the ceramic to the metal cooling block. However, several problems arise. The ceramic itself will tend to arch outward toward the hot side because of differential expansion, and also to pull away from the cooling block; and because even the cooled reverse will not match the cooling block in its thermal expansion, it will also tend to break the brazed bond by sliding parallel to the interface. The ceramist has negligible liberty to adjust this formulation to produce a desired thermal expansion, because he must conform to cogent requirements for thermal and prescribed electrical conductivity.

The text Open-Cycle MHD Power Generation, editors J. B. Heywood and G. J. Womack, Pergamon Press, 1969, L. C. Catalogue Card No. 73-79462, in section 7.3.5, pp. 554 through 558, describes electrodes of plasma-sprayed zirconia applied to the ends of a brush of nickel alloy wires in one case, and to a mesh of patinum wire in another case. Both of these electrodes were cooled at the reverse by a flow of oxygen. The brush electrode had cracks in the zirconia which permitted alkali seed material to penetrate the device; and oxidation of the nickel alloy brush itself by the cooling oxygen was severe. The mesh electrode performed somewhat better, but the face of the zirconia was severely eroded by electrochemical action.

BRIEF DESCRIPTION OF THE INVENTION

A compliant and highly thermally conductive mounting is interposed between a rigid ceramic member and a metal cooling block. This mounting is formed of curved metal strips which are mounted edgewise, and held mechanically (and in good electrical and thermal contact) by brazing to the ceramic member and to the cooling block.

DESCRIPTION OF THE PREFERRED EMBODIMENTS

Figure 1:
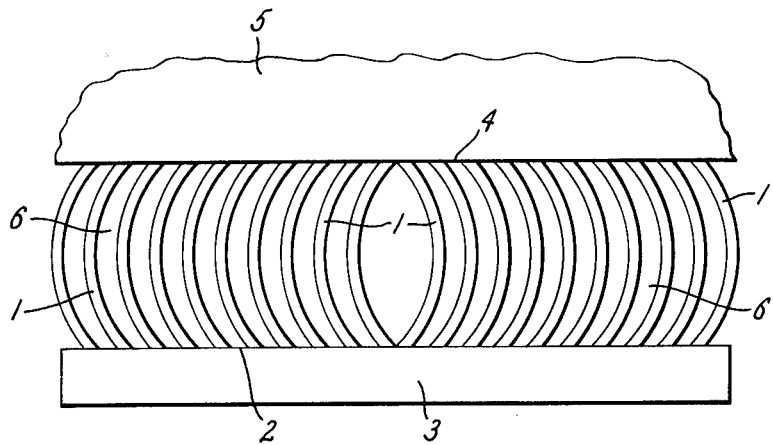
FIGS. 1 and 2 represent, respectively, elevation and profile views of ceramic member connected by the compliant mounting to a cooling block, all at room temperature.
Figure 2:
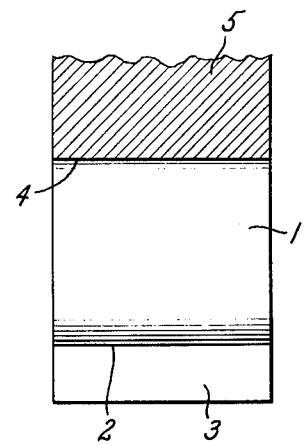

In FIGS. 1 and 2, there are represented a plurality of curved metal strips 1, which are brazed at interface 2 to a ceramic member 3, and at interface 4 to cooling block 5.

Strips 1 are represented as spaced by spaces 6, but may be nested closely together. This is convenient for construction; the strips may be painted with a separator such as a deflocculated graphite suspension to keep them from accidental binding together into an excessively rigid configuration. Also, having the strips closely packed gives maximum thermal and electrical conductivity between ceramic member 3 and cooling block 5. If it is desired to space strips 1, the spaces 6 between them may be filled, if desired, with some substance, e.g. graphite foil which will add to the thermal conductivity, or the electrical conductivity, or both. In an actual fabrication, strips 1 were of nickel, approximately 9 millimeters high and 9 millimeters wide, and were bowed out about 1.5 millimeters from the line joining their ends. The nickel stock was 0.005 inches thick (0.0125 mm.), although twice or thrice this thickness seems satisfactory.

Ceramic member 3 was approximately 2 millimeters thick (vertically in the drawings), 9 millimeters wide, and 75 millimeters long, in 4 equal segments. It was a spinel type ceramic.

Cooling block 5 was of the same width as strips 1 and ceramic member 3; it was of copper, provided with internal cooling water channels, not shown, as being conventional.

The reverse surface of ceramic member 3 was prepared for brazing by the conventional technique of painting it with a suspension of wet-milled molybdenum and manganese, and firing the coating in wet hydrogen. Brazing to the ceramic member 3 was performed first, using a brazing material of copper at a temperature of 1120° C in a hydrogen atmosphere. Brazing to the cooling block 5 was then performed with a silver base brazing material such as Handy & Harmon EZFlo at a temperature of 700° C in an atmosphere of hydrogen.

Typical gas temperatures envisaged in this embodiment are of the order of 4600° F (approximately 2550° C), and heat fluxes through the assembly may be 100 to 150 watts per square centimeter.

Figure 3:
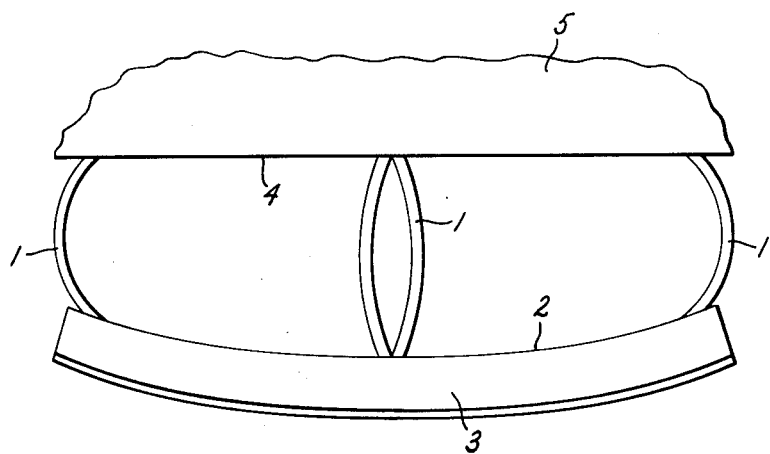
FIGS. 3 and 4 represent, respectively, elevation and profile schematic views of the structure of FIGS. 1 and 2, but at an elevated temperature such that the ceramic member is distorted by thermal expansion.
Figure 4:
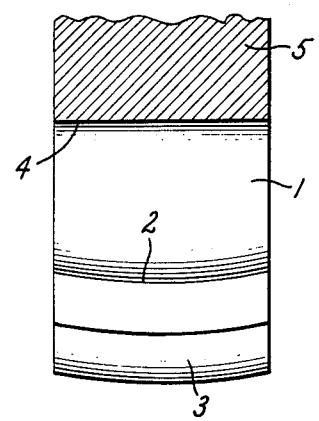

FIGS. 3 and 4 represent the structures represented by FIGS. 1 and 2, respectively, but with most of the strips 1 omitted, and with exaggerated representation of the curvature of ceramic member 3 which will result from its heating during operation. It is evident that central strips 1 will stretch slightly and end strips 1 will shorten slightly and turn inward slightly at the bottom.

Figure 5:
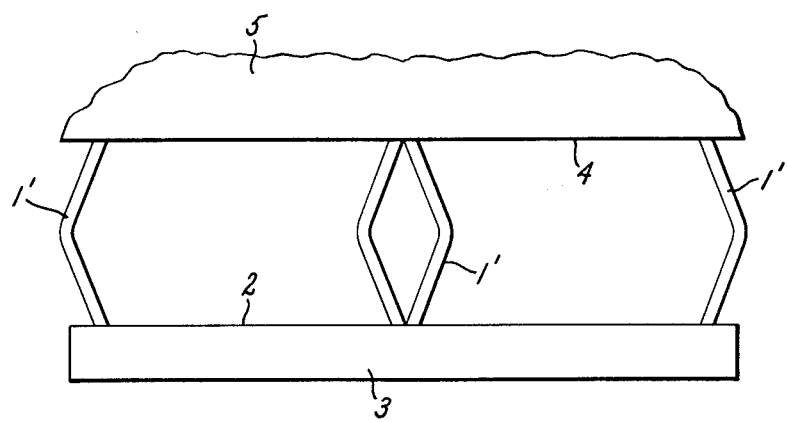
FIG. 5 represents an elevation schematic view of an alternative form of the compliant mounting.

FIG. 5 represetns a cognate of FIG. 1, but with chevron-shaped strips 1' rather than the continuously curved strips 1. clearly, any kind of bending which is compatible with close packing of strips and produces sufficient compliance for movement along the line joining the edges will be suitable.

It may be convenient for manufacture to braze the strips 1 or 1' to face plates on one or both sides, and then braze these face plates to the reverse of the electrode and the cooling block. The face plates should be thin so as not to constrain excessively the relative movement among the various strips 1 nor contribute appreciably to the total thermal resistance from the ceramic member to the cooling block.

The term "cooling block" describes one necessary function of it, but it also may serve as electrical connector and structural member. Obviously these other functions, particularly the latter, may determine its particular shape. The brazing of the various parts will produce fixation at least thermally, and in fact also electrically, conductive; clearly, welding strips 1 to cooling block 5 would also lie within the recital. Fixation methods which produced good thermal conductivity but not necessarily good electrical conductivity would be acceptable with ceramic members not intended to be used as electrodes.

While the assemblage of strips 1 has certain advantages, particularly ease of adjusting the magnitude of the compliance it provides, by alteration in the number of dimensions (including degree of curvature) of the strips, it is evident that we have taught generally the interposition of a thermally (and electrically) conductive compliance member between ceramic member 3 and cooling block 5. The term compliance member indicates that the member is distinguished by being more compliant than a solid metal block such as cooling block 5. In practice, the compliance member must be sufficiently flexible to avoid fracture of attachments to the reverse of electrode 3, and the term may be so construed. In the generic sense, the plurality of strips 1 comprises a compliance member; and the totality of edges of those strips at interface 2, or at interface 4, constitutes a face.

We claim:

1. A ceramic structure for use with a magnetohydrodynamic generator employing hot ionized gas as the working fluid, comprising:
    a ceramic member having an obverse face for exposure to the said gas, and a reverse;
    a thermally conductive compliance member having at least two faces, one of which faces is conductively fixed to the reverse of the ceramic member, the other of which faces is conductively fixed to a cooling block,
    said thermally conductive compliance member comprising a plurality of curved metal strips substantially parallel to one another, one edge of each said strip comprising one face, and the other edge of each said strip comprising the other face of the compliance member.

2. The ceramic structure claimed in claim 1 in which the ceramic member is electrically conductive at elevated temperatures.

* * * * *